Nov. 25, 1969 H. M. WIGGINS 3,480,741

VERTICAL HANGING ATTACHMENT FOR TELEPHONES

Filed June 13, 1966

2 Sheets-Sheet 1

INVENTOR
HERBERT M. WIGGINS
BY Arthur A. Jacobs
ATTORNEY

INVENTOR
HERBERT M. WIGGINS
BY
ATTORNEY

United States Patent Office 3,480,741

Patented Nov. 25, 1969

3,480,741
VERTICAL HANGING ATTACHMENT FOR TELEPHONES
Herbert M. Wiggins, 451 MacDade Blvd., Collingdale, Pa. 19023
Filed June 13, 1966, Ser. No. 557,124
Int. Cl. H04m 1/04
U.S. Cl. 179—146 3 Claims

ABSTRACT OF THE DISCLOSURE

A support assembly for holding an entire desk-type telephone unit in substantially horizontal position while the support assembly is attached to a vertical surface such as a wall. The support assembly has inclined arms upon which the base of the telephone can rest in an inclined but generally horizontal position, and has retaining means for holding the base of the telephone in this position. Connected to the base of the telephone is an attachment which has a horizontal portion overlying the switch buttons on the telephone base and a vertical portion. The horizontal portion has offset ends which are in the same inclined plane as the telephone base when the base rests on the inclined support, these offset ends bearing lightly on the switch buttons. The vertical portion of the attachment extends straight up and has a cradle on the top to receive the telephone itself. In this manner, when the telephone is positioned on the cradle of the attachment, it is in a straight horizontal plane even though the telephone base is inclined. The telephone will, therefore, not tend to roll off. At the same time, as it rests on the cradle, it presses down on the switch buttons, which are inclined, being part of the base, through the offset ends, and thereby effectively opens the telephone switch just as it would if laid directly on the cradle of the base if the base were resting on a flat horizontal surface.

This invention relates to a telephone assembly, and it particularly relates to an assembly for mounting an ordinary French-type phone on a wall or similar vertical supporting surface.

French-type phones are those having an earpiece and a mouthpiece connected together by a bridge to form a single unit. This unit is provided with a supporting base connected to the telephone circuit. The base is provided with a cradle for the phone unit and this cradle has one or more push buttons operatively connected to a switch for activating the circuit. The switch is normally closed and its buttons are normally upwardly-biased to activate the circuit. When the phone unit is seated in the cradle, it pushes down on the buttons to open the switch and deactivate the circuit.

The above-described French phones are those principally in use today. However, they require, a flat, horizontal surface to support the base. It is, however, sometimes desirable or necessary to temporarily or permanently mount such phones on a wall or other vertical surface because of lack of available horizontal space or other reasons. This cannot normally be done with such phones because the phone cannot be held in place in its cradle when the assembly is in the vertical position. Furthermore, it is difficult to securely anchor the assembly in such vertical position.

It is, therefore, an object of the present invention to provide a simple and yet efficient attachment that will securely and operatively hold a French-type phone assembly in a vertical position.

It is, therefore, an object of the present invention to provide a simple and yet efficient attachment that will securely and operatively hold a French-type phone assembly in a vertical position.

Another object of the present invention is to provide an attachment of the aforesaid type that is relatively inexpensive and that can be easily used.

Other objects and many of the attendant advantages of this invention will be readily appreciated as the same becomes better understood by reference to the following description when read in conjunction with the accompanying drawings wherein.

Figure 1:
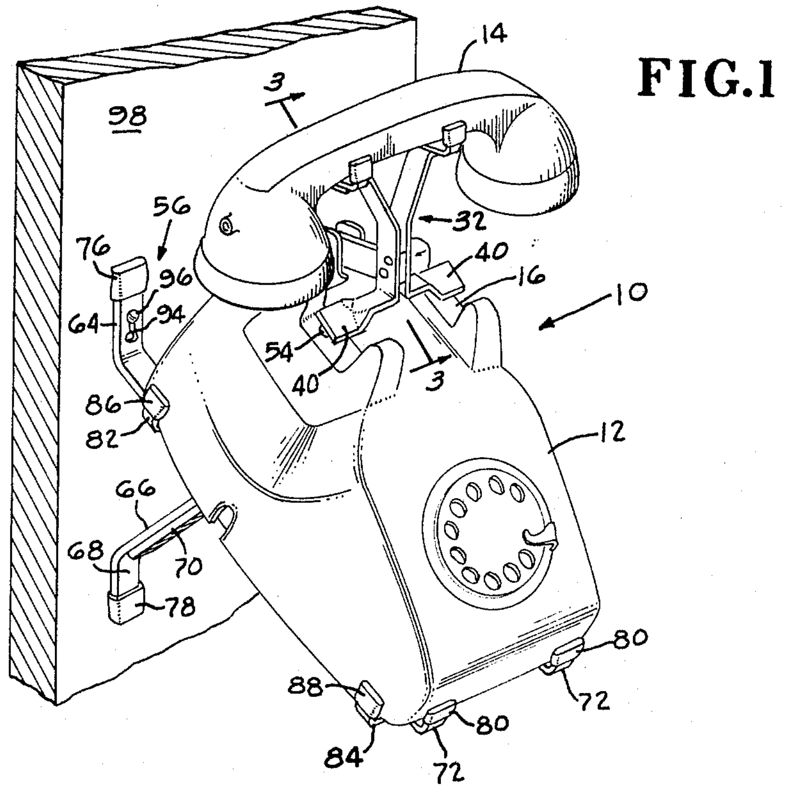
FIG. 1 is a front perspective view of an assembly embodying the present invention.

Referring now in greater detail to the various figures of the drawings wherein similar reference characters refer to similar parts, there is shown in FIG. 1 a telephone assembly, generally designated 10, comprising a base 12 of a standard construction and a French-type phone unit 14 also of standard construction.

Figure 2:
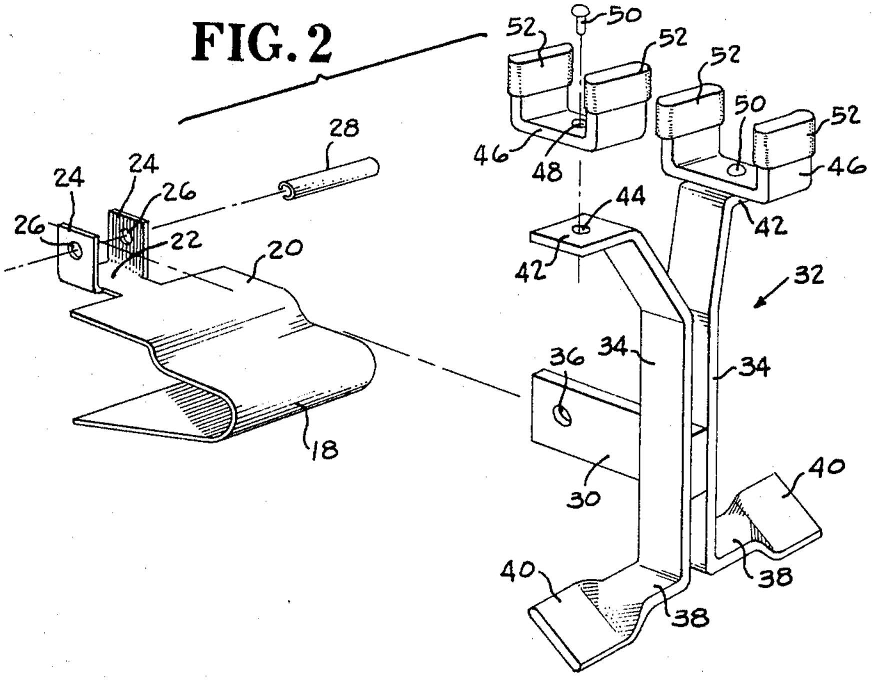
FIG. 2 is an enlarged, exploded view of the switch-actuating attachment shown in FIG. 1.

The base 12 is provided with the standard slot 14 (best seen in FIG. 3) on its back side, behind the cradle 16. This slot 14 is ordinarily provided for the purpose of affording a finger-hold to pick up the base 12, but is here utilized for another purpose, and, for this purpose, it releasably receives a spring-metal clamp 18 (shown both in FIGS. 2 and 3) that comprises two spring-metal portions unitarily connected by an elbow portion. The spring metal portions are biased away from each other and, therefore, effect a clamping action when inserted in the slot 14.

The upper portion of the clamp 18 is integral with a flat plate 20 which is, itself, integral with a narrow extension 22. The extension 22 is provided at its free end portion with a pair of spaced lateral ears 24, each of which has a hole 26, these holes being in alignment for the purpose of receiving a pin, blot, rivet, or the like, indicated at 28. The pin 28 is used to secure a flat prong 30, extending laterally from a switch-actuator attachment, generally designated 32, between the ears 24.

The attachment 32 comprises a pair of rigid straps 34, of metal, plastic, or the like, which are parallel to each other and are connected, as by welding or the like, to one end of the prong 30, the prong 30 thereby serving to secure the straps 34 to each other as well as to itself. The opposite end portion of the prong 30 is provided with a hole 36 to receive the pin 28 when the prong is in position between the ears 24 as heretofore described. Each strap 34 is provided with a lateral foot 38 at its lower end, the feet 38 extending oppositely from each other. Each foot 38 is provided with an offset outer end to which is integrally connected a flat toe portion 40.

The upper ends of the straps 34 are outwardly inclined away from each other and terminate in lateral flanges 42, each flange 42 having a hole 44. Mounted on each flange 42 is a seat 46 consisting of a bottom wall and opposite side walls. The bottom wall of each seat 46 is provided with a hole 48 adapted to be aligned with the corresponding hole 44 to receive a rivet, bolt, pin, or the like, shown at 50, for the purpose of securing the seat 46 to its respective flange 42. Each seat is provided with cushioning means 52, made of any desirable material, on its opposite side walls.

Figure 3:
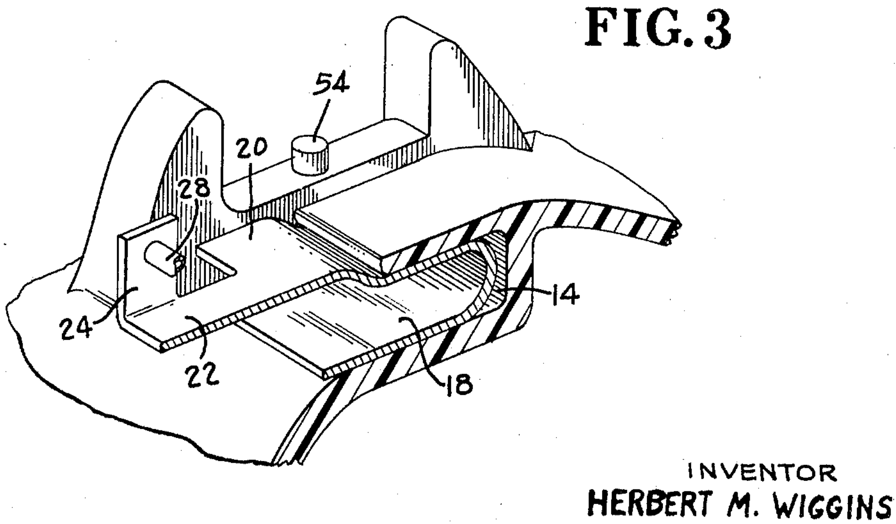
FIG. 3 is an enlarged, fragmentary view showing how the switch-actuating attachment is secured to the base, the view being generally on line 3—3 of FIG. 1 with parts deleted for clarity.

When the attachment 32 is secured to the base 12 by inserting the clamp 18 into the slot 14 (as shown in FIG. 3), the toes 40 do not exert any downward pressure on the switch buttons 54, as long as no downward force is applied to the attachment, and the switch, therefore, remains closed to activate the circuit. However, when the phone unit 14 is positioned in the seats 46 (as shown in FIG. 1) it presses down on the attachment 32 and causes the offset toes 40 to press down on the buttons 54, thereby opening the switch and deactivating the circuit.

It is here to be noted that when the base 12 is in a vertically-inclined position (as in FIG. 1), if the phone unit 14 were to be placed directly into its cradle, as in the normal manner, it would immediately fall off due to the action of gravity. The attachment 32, however, compensates for the inclination because it stands vertically straight, but, by reason of the offset toes 40, permits the phone unit to be maintained in horizontal position while still permitting actuation of the switch buttons due to the weight of the phone unit.

Figure 4:
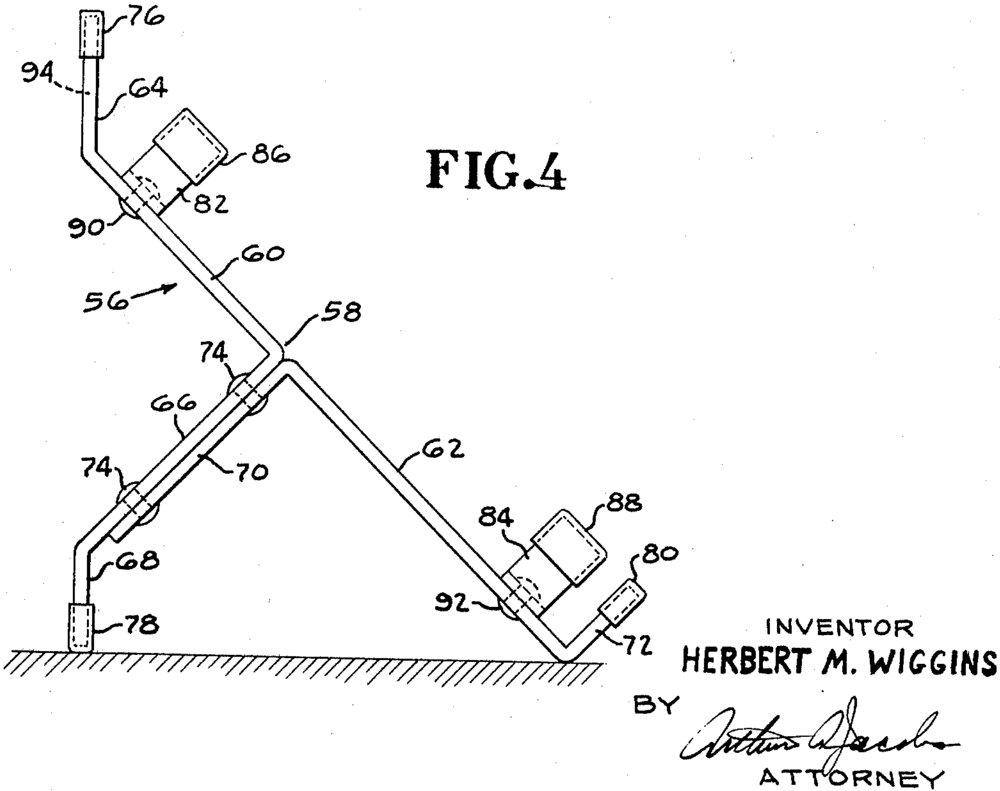
FIG. 4 is a side elevational view of the supporting bracket.

The telephone assembly is mounted in the vertically inclined position by means of a bracket, generally designated 56 (best seen in FIG. 4). This bracket 56 consists of two parallel holders 58 (one being seen in FIG. 4, but the other being behind it but blocked from view because of the elevational illustration). Each holder 58 consists of two segments, an upper segment 60 and a lower segment 62. The upper segment 60 has an integral vertically offset portion 64 at its upper end and a perpendicular leg portion 66 integral with its lower end. The lower end of the leg portion 66 is integral with a vertical foot portion 68. The lower segment 62 has a perpendicular portion 70 integral with its upper end and an oppositely perpendicular flange 72 at its lower end. The portion 70 is connected to the leg 66 by rivets or the like shown at 74. The members 64, 68 and 72 are each provided with a guard sleeve as at 76, 78 and 80 respectively.

The segment 60 is provided with a laterally offset finger 82 adjacent its upper end and with a similar offset finger 84 adjacent its lower end. Each of the fingers 82 and 84 is provided with a guard sleeve, as at 86 and 88 respectively. The fingers 82 and 84 are secured to the respective segments 60 and 62 by rivets 90 and 92 or the like.

The portion 64 of each holder 58 is provided with a key slot 94 which is adapted to receive a screw, hook, or other headed means, shown at 96 in FIG. 1, which is connected to a wall or other vertical support 98 and acts as a hanger for the bracket. When the bracket 58 is hung in this position, the foot portion 68 of each holder 58 presses against the wall 98 and acts as a brace to hold the bracket firmly in position.

It can be seen from the above description that when it is desired to mount a French-type telephone on a wall or other vertical support, it is merely necessary to connect the attachment 32 to the phone base 12 by inserting the clamp 18 in the slot 14 and then to hang the bracket 56 on the hangers 96 on the wall. The phone unit 14 is then cradled on the seats 46 of the attachment 32.

Although the invention has been described as used for hanging a telephone on a vertical surface such as a wall, this being its primary purpose, it can also be supported on a horizontal surface as indicated in FIG. 4.

Obviously, many modifications of the present invention are possible in the light of the above teachings. It is, therefore, to be understood that within the scope of the appended claims, the invention may be practiced otherwise than as specifically described.

The invention claimed is:

1. A telephone assembly comprising a support bracket, said bracket having means to connect it to a vertical surface, said bracket including inclined support means, said support means being inclined relative to said vertical surface when said bracket is connected thereto, retaining means on said support means, a telephone base on said support means, said retaining means holding said base, in position on said support means, said base having a cradle within which are positioned telephone switch buttons, an attachment connected to said base separately from said bracket, said attachment having a vertical section and a lateral section, said lateral section having offset means overlying said switch buttons and inclined in a plane parallel to the inclined plane of said base, said vertical portion extending upwardly in a plane substantially parallel to the plane of said vertical surface, said vertical section having a cradle thereon, said cradle being arranged in a horizontal plane substantially perpendicular to said vertical section, and an integral telephone unit releasably resting on the cradle of said vertical section, the offset means of said lateral section overlying said switch buttons without pressure thereon when said telephone unit is removed from the cradle of the attachment, and exerting downward pressure on said switch buttons when said telephone unit rests on the cradle of said attachment.

2. The assembly of claim 1 wherein said base is provided with a slot and said attachment is provided with a flexible clamping means clampingly but releasably positioned in said slot.

3. The assembly of claim 1 wherein said bracket comprises upstanding flanges having key-slots therein for receiving hanger means on said vertical surface, and downwardly extending flanges aligned with said upstanding flanges and constructed and arranged to bracingly abut said vertical surface when said key-slot are engaged with said hanger means.

References Cited

UNITED STATES PATENTS

| | | | |
|---|---|---|---|
| 2,878,324 | 3/1968 | Guerrero | 179—146 |
| 2,492,375 | 12/1949 | Boswau et al. | 179—146 |
| 2,277,280 | 3/1942 | Vaughan | 179—146 |

KATHLEEN H. CLAFFY, Primary Examiner

D. L. RAY, Assistant Examiner